United States Patent
Hsieh

(10) Patent No.: US 12,147,677 B1
(45) Date of Patent: Nov. 19, 2024

(54) DATA MANAGEMENT METHOD FOR SOLID STATE STORAGE DEVICE

(71) Applicant: SOLID STATE STORAGE TECHNOLOGY CORPORATION, Taipei (TW)

(72) Inventor: Shih-Hung Hsieh, Taipei (TW)

(73) Assignee: SOLID STATE STORAGE TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 18/375,563

(22) Filed: Oct. 2, 2023

(30) Foreign Application Priority Data

Aug. 11, 2023 (CN) .......................... 202311012521.4

(51) Int. Cl.
*G06F 3/06* (2006.01)
(52) U.S. Cl.
CPC .......... *G06F 3/0613* (2013.01); *G06F 3/0619* (2013.01); *G06F 3/0647* (2013.01); *G06F 3/0679* (2013.01)

(58) Field of Classification Search
CPC .... G06F 3/0613; G06F 3/0619; G06F 3/0647; G06F 3/0679
See application file for complete search history.

(56) References Cited

U.S. PATENT DOCUMENTS 9,390,782 B2 * 7/2016 Best ...................... G11C 11/406

* cited by examiner

*Primary Examiner* — Eric Cardwell
(74) *Attorney, Agent, or Firm* — WPAT, P.C

(57) ABSTRACT

A data management method for a solid state storage device is provided. The solid state storage device can selectively perform a TACW operation. While the TACW operation is performed, the controlling circuit determines a specified time interval corresponding to the largest amount of write data. Moreover, a portion of the write data stored in the specific time interval will be moved to another location of the non-volatile memory. When the solid state storage device performs the data remediation process according to the data retention time, the time period of performing the data remediation process is largely shortened. Consequently, the performance of the solid state storage device can be enhanced.

9 Claims, 5 Drawing Sheets

DATA MANAGEMENT METHOD FOR SOLID STATE STORAGE DEVICE

This application claims the benefit of People's Republic of China application Serial No. 202311012521.4, filed Aug. 11, 2023, the subject matter of which is incorporated herein by reference.

FIELD OF THE INVENTION

The present invention relates to a data management method for a solid state storage device, and more particularly to a solid state storage device performing a time axis compensator write (TACW) operation and a data management method for the solid state storage device.

BACKGROUND OF THE INVENTION

As known, solid state storage devices such as SD cards or solid state drives (SSD) are widely used in various data storage devices.

FIG. 1A is a schematic functional block diagram illustrating the architecture of a conventional solid state storage device. As shown in FIG. 1A, the solid state storage device 100 comprises a controller 110, a volatile memory 130 and a non-volatile memory 140. For example, the volatile memory 130 is a dynamic random access memory (DRAM) or a static random access memory (SRAM). For example, the volatile memory 130 of the solid state storage device 100 shown in FIG. 1A is a dynamic random access memory (DRAM).

The controller 110 of the solid state storage device 100 is connected with a host 120 through an external bus 105. For example, the external bus 105 is a USB bus, a SATA bus, a PCIe bus, a M.2 bus, or the like. The DRAM 130 is connected with the controller 110. In addition, the controller 110 is connected with the non-volatile memory 140 through an internal bus 115.

In response to a write command from the host 120, the write data from the host 120 is temporarily stored into the DRAM 130 by the controller 110. After an error correction (ECC) process is completed, a write action is performed by the controller 110. Consequently, the write data is stored from the DRAM 130 into the non-volatile memory 140.

In response to a read command from the host 120, a read data is read from the non-volatile memory 140 and temporarily stored into the DRAM 130 by the controller 110. After the error correction (ECC) process is completed, the read data is transmitted from the DRAM 130 to the host 120.

Generally, the non-volatile memory 140 comprises plural blocks. Each block comprises plural pages. When the write action is performed, the write data is stored into the non-volatile memory 140 in units of pages by the controller 110. When an erase action is performed, the write data in the non-volatile memory 140 is erased in units of blocks by the controller 110. After the write action has been performed many times by the controller 110, the used blocks of the non-volatile memory 140 contain invalid pages and valid pages. The valid page contains valid write data. The invalid page contains invalid write data. Furthermore, the controller 110 will enable a garbage collection (GC) process at an appropriate time.

When the GC process is performed, the controller 110 collects the write data of all valid pages in the used block, and moves the write data to a blank block. After the GC process is completed, no valid pages are contained in the used block. Then, the erase action is performed on the used block by the controller 110. Consequently, the used block becomes the blank block. The blank block can be used to store the new write data by the controller 110. The process including the above GC process and the erase action is referred as a reclamation operation.

In case that there are many blank blocks in the non-volatile memory 140, i.e., the available storage space of the non-volatile memory 140 is large, the controller 110 will not perform the reclamation operation. In case that there are few blank blocks in the non-volatile memory 140, i.e., the available storage space of the non-volatile memory 140 is small, the controller 110 will perform the reclamation operation.

For example, the storage capacity of the non-volatile memory 140 is 1 Terabyte (TB). When the available storage space of the non-volatile memory 140 is 0.2 TB, the controller 110 will perform the reclamation operation at an appropriate time. Of course, the threshold storage space is not restricted to 0.2 TB. In practice, the controller 110 can selectively decide the timing to execute the reclamation operation. For example, in some situations, the reclamation operation is performed when the remaining available storage space is 0.1 TB or 0.3 TB.

FIG. 1B schematically illustrates the data sources of the conventional solid state storage device when the write action is performed. When the solid state storage device 100 is operated normally and the write action is performed by the controller 110, the data source is the write data 150 from the host 120 or the write data 155 generated in the reclamation operation. Generally, the write data 150 from the host 120 are all valid data.

Furthermore, after the controller 110 performs the GC process on the non-volatile memory 140, all of the collected data are the valid data. That is, the write data 155 generated in the reclamation operation are also the valid data. In other words, when the controller 110 of the conventional solid state storage device 100 performs the write action, the controller 110 stores the valid write data into the non-volatile memory 140.

Furthermore, the controller 110 of the conventional solid state storage device 100 processes the write data from the two different data sources at different times. For example, when the solid state storage device 100 receives the write data 150 from the host 120, the write data 150 from the host 120 is stored into the non-volatile memory 140 by the controller 110. In case that the controller 110 does not execute the write command or the read command from the host 120, the controller 110 is in a standby state. In the standby state, the controller 110 performs the reclamation operation, including the GC process and the erase action. Consequently, the write data 155 generated in the reclamation operation can be stored into the non-volatile memory 140. Consequently, the performance of the solid state storage device 100 is not adversely affected.

Due to the characteristics of the memory cell of the non-volatile memory 140, the manufacturer of the non-volatile memory 140 defines a data retention time. After the write data is stored into the non-volatile memory 140, the accuracy and the integrity of the write data during the data retention time can be confirmed. If the time period of storing the write data into the non-volatile memory 140 exceeds the data retention time, the accuracy and the integrity of the write data cannot be guaranteed. In other words, the write data is possibly lost or changed into an erroneous write data.

Due to the characteristics of the memory cell of the non-volatile memory 140, the controller 110 has to monitor the time period of storing the write data into the non-volatile memory 140. For example, after one write data is stored into the non-volatile memory 140, if the write data has not been read, moved or replaced, this write data will be regarded as a valid non-accessed write data. When the time period of storing the valid non-accessed write data reaches the data retention time, the controller 110 has to immediately perform a data remediation process and process the valid non-accessed write data with a higher priority. If the data remediation process is not performed, the write data is possibly lost or changed into the erroneous write data.

For example, the data remediation process is a reclamation operation for moving the valid non-accessed write data to other locations of the non-volatile memory 140. Alternatively, the data remediation process is a touch read operation for processing the valid non-accessed write data.

When the reclamation operation or the touch read operation is performed, the time period of storing the valid non-accessed write data will be calculated again, and the accuracy and the integrity of the write data will be guaranteed. However, in some situations, the data remediation process may largely impair the performance of the solid state storage device 100.

FIG. 1C is a plot illustrating the write data amount of the solid state storage device varying with time. It is assumed that the storage capacity of the non-volatile memory 140 in the solid state storage device 100 is 1 Terabyte (TB) and the data retention time of the non-volatile memory 140 is one week.

In FIG. 1C, the time axis is divided into plural time intervals in units of 1 day. On the first day, a large amount of write data (e.g., 0.6 TB) from the host 120 are stored into the non-volatile memory 140. In the subsequent 6 days (i.e., the 2nd day to the 7th day), only a small amount of write data (e.g., about 0.03 TB~0.1 TB) from the host 120 are stored into the non-volatile memory 140.

For example, on the subsequent six days (i.e., the 2nd day to the 7th day), the write data contain first-portion write data and second-portion write data. The logic block addresses (LBAs) of the first-portion write data are identical to the logic block addresses of the write data on the first day. In other words, the old write data on the first day comprising the same logic block addresses are changed into the invalid data (i.e., the region marked with oblique lines) and replaced by the first-portion write data. The logic block addresses of the second-portion write data are different from the logic block addresses of the write data on the first day. In other words, the second-portion write data are new write data stored into the non-volatile memory 140.

As mentioned above, the write data amount on the first day is large, but the write data amount on the subsequent six days (i.e., the 2nd day to the 7th day) is very small. Expectedly, when the data retention time (7 days) reaches, the write data of the first day will contain a large number of valid non-accessed write data and a small number of invalid data (i.e., the region marked with oblique lines). For preventing from data loss or occurrence of erroneous data, the controller 110 has to perform the data remediation process on the write data of the first day with a higher priority before the data retention time reaches. That is, in the beginning of the eighth day (e.g., the time point ta), the controller 110 has to perform the data remediation process on the write data of the first day with a higher priority.

Please refer to FIG. 1C again. At the time point ta, the controller 110 performs the data remediation process (e.g., the reclamation operation) on the write data of the first day. Firstly, the controller 110 performs the GC process to collect the valid data of the write data of the first day (i.e., the region marked with white color), wherein the invalid data (i.e., the oblique region) are not collected. Then, the valid data (i.e., the region marked with white color) are moved to other locations of the non-volatile memory 140. In other words, during the reclamation operation of the eighth day, the write data 180 generated in the reclamation operation are stored into other locations of the non-volatile memory 140 by the controller 110 again.

Since the write data of the first day contain a large number of valid non-accessed write data, it takes a long time for the controller 110 to perform the data remediation process to store the collected valid data 180 into the non-volatile memory 140. However, if the host 120 also issues the write command to store a write data 190 (e.g., 0.35 TB) into the non-volatile memory 14 during the data remediation process, the following problem occurs. Since the data remediation process has the higher priority, the controller 110 has to perform the reclamation operation before the write data 190 from the host 120 is stored into the non-volatile memory 140. Since the solid state storage device 100 has very serious writing latency, the performance of the solid state storage device 100 is largely deteriorated.

SUMMARY OF THE INVENTION

An embodiment of the present invention provides a data management method for a solid state storage device. The solid state storage device includes a non-volatile memory. The data management method includes the following steps. Firstly, a first average write speed in an (N−2)-th time interval is calculated, wherein N is a positive integer. Then, a second average write speed in an (N−1)-th time interval is calculated. After the second average write speed is subtracted from the first average write speed, an average write speed difference is obtained. If the average write speed difference is lower than a threshold write speed, a time axis compensator write operation in an N-th time interval is disabled. Then, an instant write speed is monitored. If the average write speed difference is higher than the threshold write speed and the instant write speed is higher than the average write speed difference, the time axis compensator write operation in the N-th time interval is disabled. If the average write speed difference is higher than the threshold write speed and the instant write speed is lower than the average write speed difference, the time axis compensator write operation in the N-th time interval is enabled.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

In the conventional solid state storage device 100, it takes a long time for the controller 110 to perform the data remediation process. Consequently, the performance of the solid state storage device 100 is largely deteriorated. For overcoming the drawbacks of the conventional technologies, the present invention provides a solid state storage device using a data management method. The data management method is related to a time axis compensator write (TACW) operation. The data management method related to the TACW operation will be described as follows.

Figure 2A:
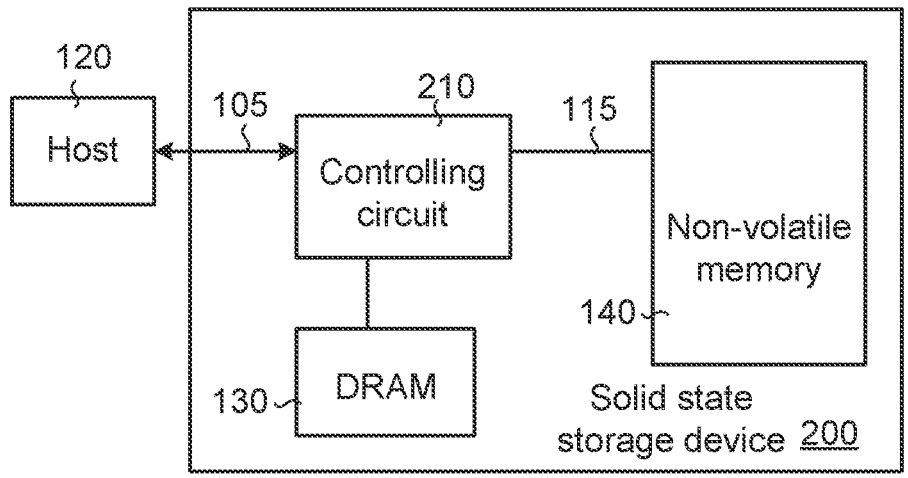
FIG. 2A is a schematic functional block diagram illustrating the architecture of a solid state storage device according to an embodiment of the present invention.

FIG. 2A is a schematic functional block diagram illustrating the architecture of a solid state storage device according to an embodiment of the present invention. As shown in FIG. 2A, the solid state storage device 200 comprises a controlling circuit 210, a volatile memory 130 and a non-volatile memory 140. For example, the volatile memory 130 is a dynamic random access memory (DRAM) or a static random access memory (SRAM).

Figure 1A:
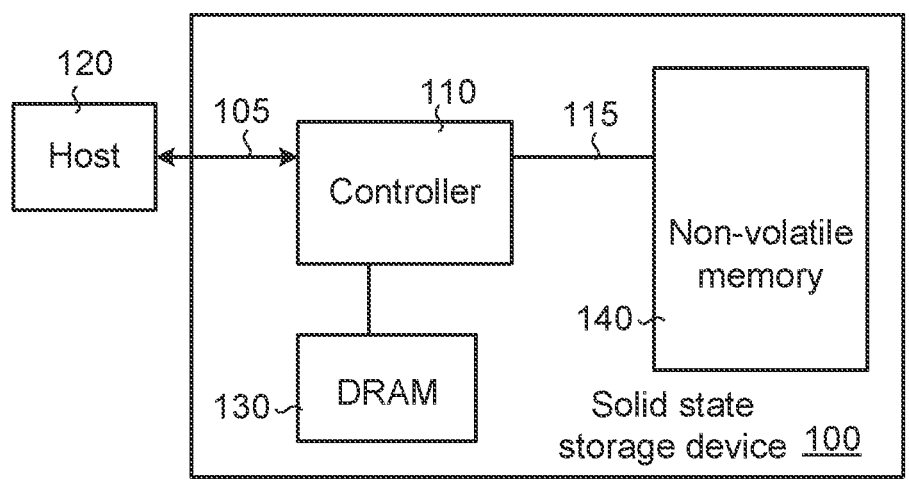
FIG. 1A (prior art) is a schematic functional block diagram illustrating the architecture of a conventional solid state storage device.
Figure 1B:
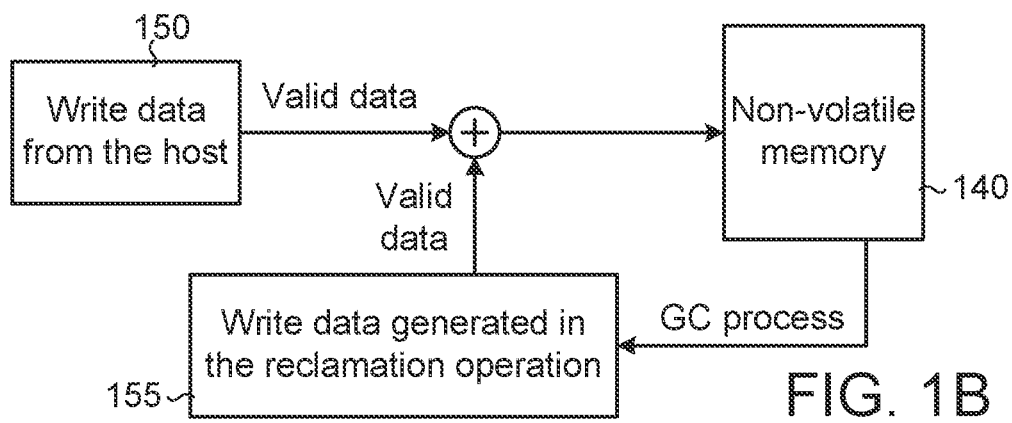
FIG. 1B (prior art) schematically illustrates the data sources of the conventional solid state storage device when the write action is performed.
Figure 1C:
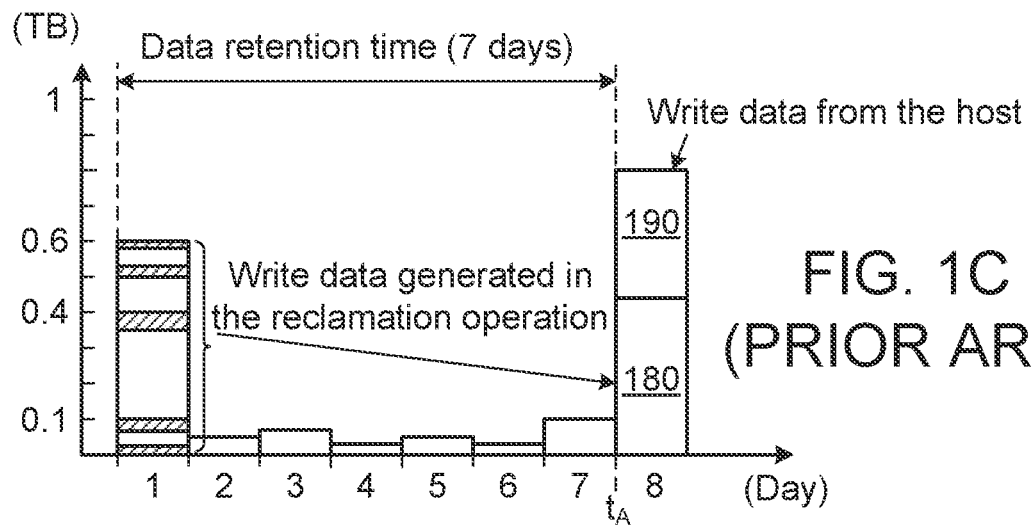
FIG. 1C (prior art) is a plot illustrating the write data amount of the solid state storage device varying with time.

In comparison with the solid state storage device 100 of FIG. 1A, the controlling circuit 210 in the solid state storage device 200 of the present invention can perform the TACW operation. Moreover, the other actions performed by the solid state storage device 200, for example the write action, the read action and the GC operation are similar to those performed by the solid state storage device 100 of FIG. 1A, and are not redundantly described herein.

Figure 2B:
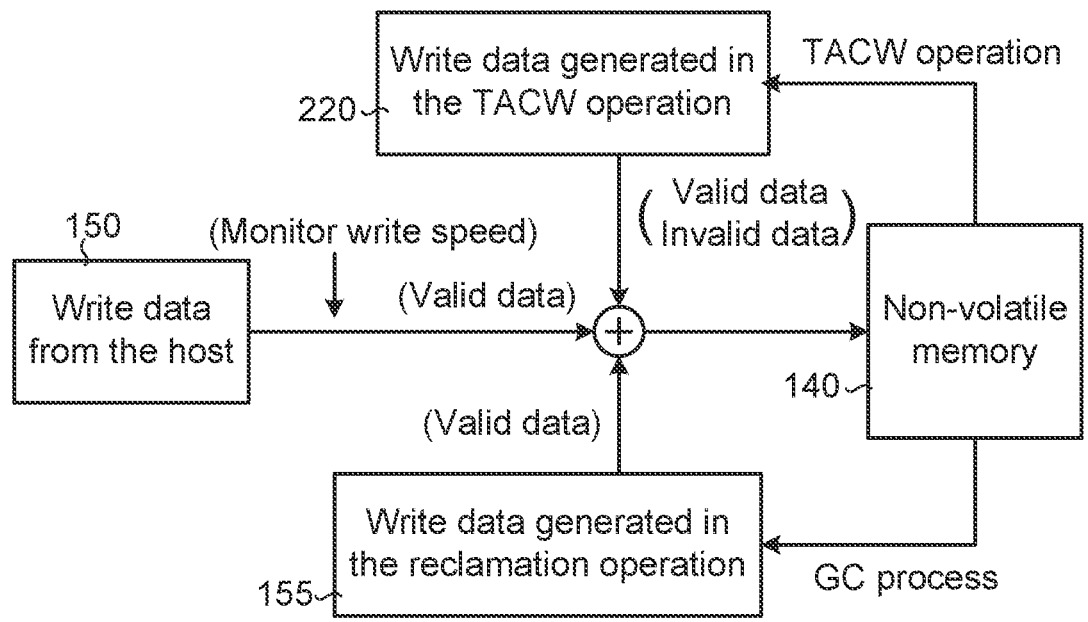
FIG. 2B schematically illustrates the data sources of the solid state storage device according to the embodiment of the present invention when the write action is performed.

FIG. 2B schematically illustrates the data sources of the solid state storage device according to the embodiment of the present invention when the write action is performed. When the solid state storage device 200 is operated normally and the write action is performed by the controlling circuit 210, the data source is the write data 150 from the host, the write data 155 generated in the reclamation operation or the write data 220 from the TACW operation.

Generally, the write data 150 from the host and the write data 155 generated in the reclamation operation are all valid data. Similarly, the write data 150 from the host and the write data 155 generated in the reclamation operation are processed by the controlling circuit 210 of the solid state storage device 200 at different times. For example, in case that the controlling circuit 210 does not execute the write command or the read command from the host 120, the controlling circuit 210 is in a standby state. In the standby state, the controlling circuit 210 performs the reclamation operation, including the GC process and the erase action. Consequently, the write data 155 generated in the reclamation operation can be stored into the non-volatile memory 140. In this way, the performance of the solid state storage device 200 is not adversely affected.

When the controlling circuit 210 performs the TACW operations, the write data 220 generated in the TACW operation contain valid data and invalid data. While the write data 150 from the host is subjected to the write action by the controlling circuit 210 and the write data 150 are stored into the non-volatile memory 140, the controlling circuit 210 monitors the instant write speed of the write action. Moreover, according to the instant write speed, the controlling circuit 210 determines whether the TACW operation is enabled or not. Consequently, when the TACW operation is enabled, the controlling circuit 210 performs the write action on the write data 150 from the host and the write data 220 in the TACW operation. For example, after one write data is stored in the non-volatile memory 140 and before the time period of storing the write data into the non-volatile memory 140 reaches the data retention time, the controlling circuit 210 selectivity performs the TACW operation. Moreover, a portion of the write data stored in a specified time interval is moved into another location of the non-volatile memory 140.

Figure 2C:
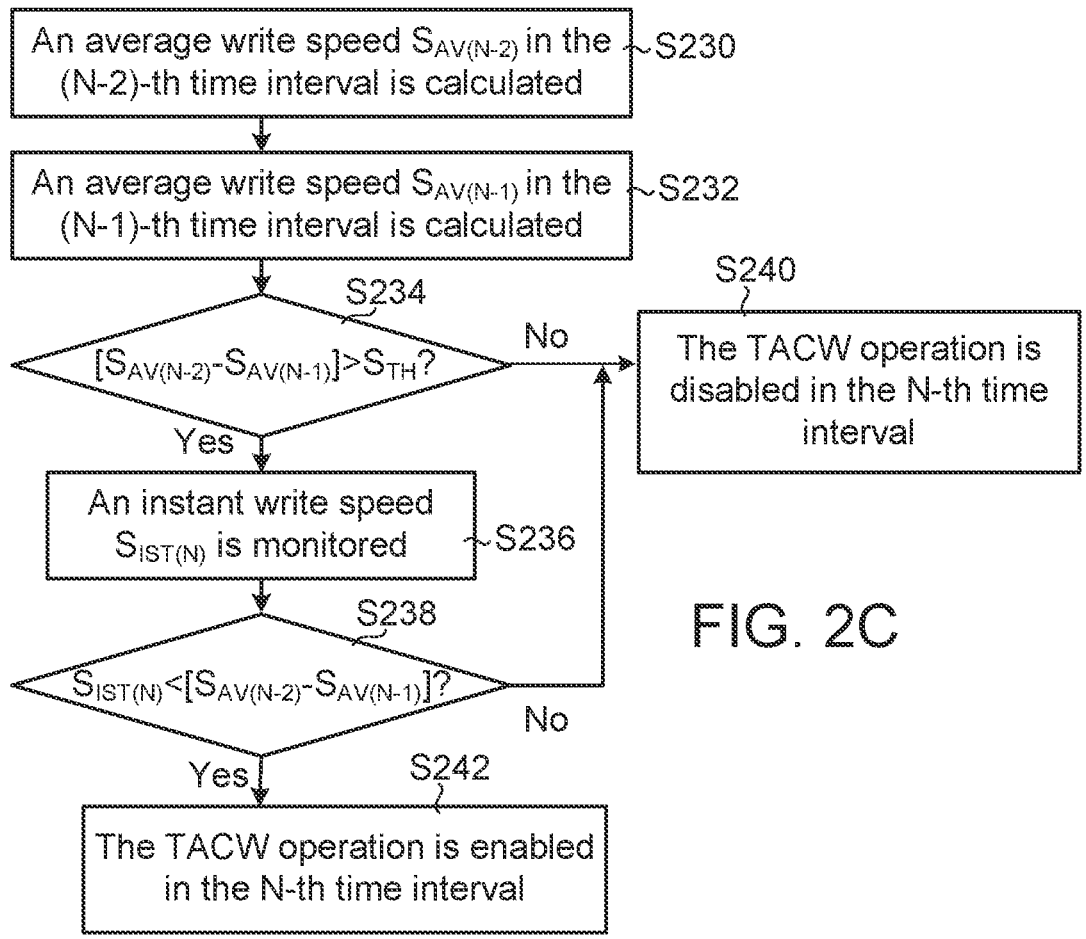
FIG. 2C is a flowchart illustrating a data management method for the solid state storage device according to the embodiment of the present invention.

FIG. 2C is a flowchart illustrating a data management method for the solid state storage device according to the embodiment of the present invention.

Firstly, an average write speed $S_{AV(N-2)}$ in the (N−2)-th time interval is calculated (Step S230) and an average write speed $S_{AV(N-1)}$ in the (N−1)-th time interval is calculated (Step S232). The N-th time interval is the current time interval, and the (N−2)-th time interval and the (N−1)-th time interval indicate two consecutive time intervals prior to the N-th time interval, wherein N is a positive integer. In the (−1)-th time interval and the (0)-th time interval, no write data have been stored. In other words, the average write speed may be regarded as 0 in the (−1)-th time interval and the (0)-th time interval.

Then, an average write speed difference between the two consecutive time intervals (i.e., $[S_{AV(N-2)}-S_{AV(N-1)}]$) is calculated by controlling circuit 210. Moreover, the controlling circuit 210 judges whether the average write speed difference between the two consecutive time intervals is higher than a threshold write speed $S_{TH}$ (Step S234). That is, the step S234 is performed to judge whether the condition of $[S_{AV(N-2)}-S_{AV(N-1)}]>S_{TH}$ is satisfied. In case that the average write speed difference between the two consecutive time intervals is lower than the threshold write speed $S_{TH}$, the TACW operation is disabled in the N-th time interval (Step S240).

Furthermore, if the average write speed difference between the two consecutive time intervals is higher than the threshold write speed $S_{TH}$, the instant write speed $S_{IST(N)}$ will be monitored (Step S236). In other words, when the write data 150 from the host is subjected to the write action in the N-th time interval by the controlling circuit 210, the controlling circuit 210 further monitors the instant write speed $S_{IST(N)}$ of the write action.

Then, the controlling circuit 210 judges whether the instant write speed $S_{IST(N)}$ is lower than the average write speed difference between the two consecutive time intervals (Step S238). That is, the step S238 is performed to judge whether the condition of $S_{IST(N)}<[S_{AV(N-2)}-S_{AV(N-1)}]$ is satisfied. In case that the instant write speed $S_{IST(N)}$ is higher than the average write speed difference between the two consecutive time intervals, the TACW operation is disabled in the N-th time interval (Step S240). Whereas, if the instant write speed $S_{IST(N)}$ is lower than the average write speed difference between the two consecutive time intervals, the TACW operation is enabled in the N-th time interval (Step S242).

In an embodiment, while the TACW operation is performed, the controlling circuit 210 determines a specified time interval prior to the N-th time interval. For example, the amount of the write data in the specified time interval is the largest. Then, portions of the write data that are stored in the specified time interval will be moved to other locations of the non-volatile memory 140. In addition, the time length between the specified time interval and the N-th time interval is shorter than the data retention time.

FIGS. 3A to 3H are plots illustrating the write data amount of the solid state storage device of the present invention varying with time. As mentioned above, the solid state storage device 200 of the present invention can selectively enable the TACW operation. It is assumed that the storage capacity of the non-volatile memory 140 is 1 Terabyte (TB), the data retention time of the non-volatile memory 140 is one week, and the threshold write speed $S_{TH}$ is 0.1 Gigabyte (GB)/min.

Figure 3A:
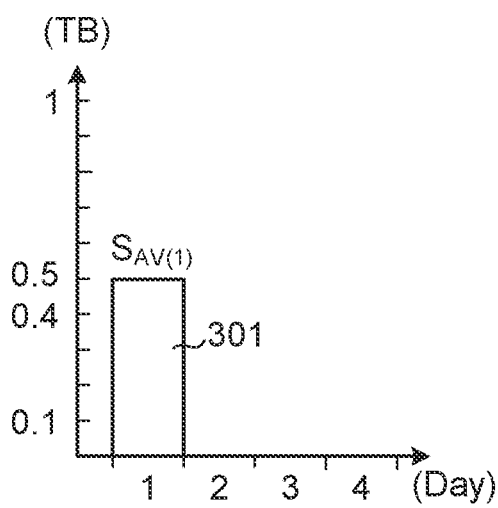
FIGS. 3A to 3H are plots illustrating the write data amount of the solid state storage device of the present invention varying with time.

As shown in FIG. 3A, the time axis is divided into plural time intervals in units of 1 day. On the first day, the write data 301 from the host 120 (e.g., approximately 0.5T) are stored into the non-volatile memory 140. Consequently, the average write speed $S_{AV(1)}$ is approximately 0.356 GB/min.

Figure 3B:
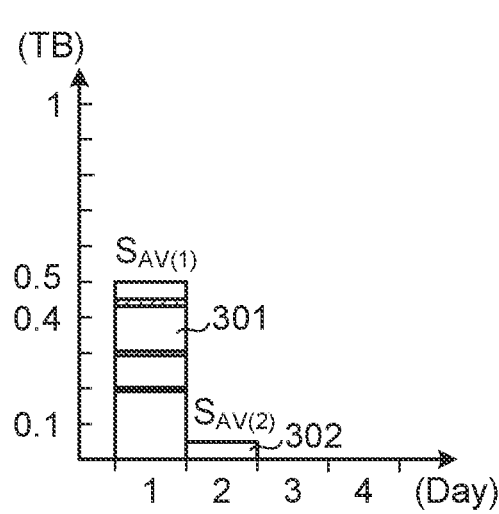

Please refer to FIG. 3B. On the second day, the write data 302 from the host 120 (approximately 0.05T) are stored into the non-volatile memory 140. Consequently, on the second day, the average write speed $S_{AV(2)}$ is approximately 0.036 GB/min. Generally, a portion of the write data 301 stored on the first day is replaced by a portion of the write data 302 stored on the second day. Consequently, a portion of the write data 301 is changed to the invalid data (i.e., the region marked with oblique lines). Moreover, the average write speed difference between the two consecutive time intervals is 0.32 GB/min, i.e., $[S_{AV(1)}-S_{AV(2)}]=0.32$ GB/min. In other words, the amount of the write data stored on the second day is lower than the amount of the write data stored on the first day. As mentioned above, the threshold write speed $S_{TH}$ is 0.1 GB/min. In other words, $[S_{AV(1)}-S_{AV(2)}]>S_{TH}$. Therefore, on the third day, the controlling circuit 210 will monitor the instant write speed $S_{IST(3)}$ to determine whether the TACW operation is enabled or not.

Figure 3C:
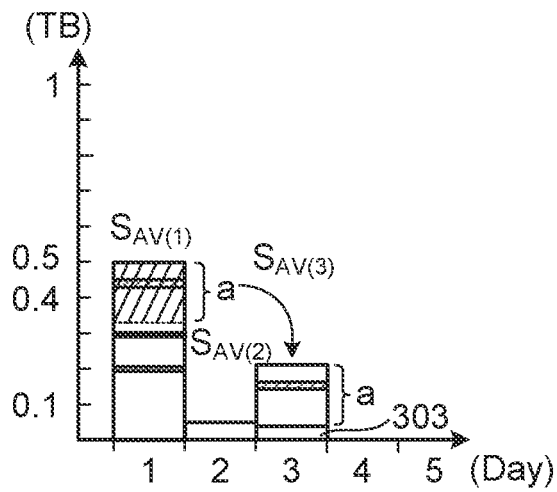

For example, on the third day, the controlling circuit 210 monitors that the instant write speed $S_{IST(3)}$ is higher than the average write speed difference between the two consecutive time intervals (e.g., 0.32 GB/min). In other words, the amount of the write data from the host 120 is large. Meanwhile, the TACW operation is disabled by the controlling circuit 210. Whereas, as shown in FIG. 3C, the controlling circuit 210 monitors that the instant write speed $S_{IST(3)}$ is lower than the average write speed difference of the two consecutive time intervals (0.32 GB/min) on the third day. In other words, few amount of the write data from the host 120 is stored on the third day. Consequently, the TACW operation is enabled by the controlling circuit 210.

While the TACW operation is performed, the controlling circuit 210 determines a specified time interval corresponding to the largest amount of write data. Moreover, a portion of the write data stored in the specific time interval will be moved to another location of the non-volatile memory 140. As shown in FIG. 3C, the amount of the write data stored on the first day is the largest. Consequently, when the TACW operation is performed on the third day, a portion of the write data stored on the first day (e.g., the portion "a") is moved to another location of the non-volatile memory 140 by the controlling circuit 210. After the write data is moved, the portion of the write data stored on the first day (e.g., the portion "a") will be changed as the invalid data (i.e., the region marked with oblique lines).

Please refer to FIG. 3C. On the third day, the write data contain the write data 303 from the host (e.g., approximately 0.04 TB) and the write data generated in the TACW operation (e.g., the portion "a" of approximately 0.17 TB). Moreover, the 0.17 TB of the write data generated in the TACW operation (e.g., the portion "a") contain valid data (i.e., the region marked with white color) and the invalid data (i.e., the region marked with oblique lines).

One the third day, the write data stored into the non-volatile memory 140 is approximately 0.21 TB. Consequently, on the third day, the average write speed $S_{AV(3)}$ is approximately 0.149 GB/min. The average write speed difference between the two consecutive time intervals is 0.113 GB/min, i.e., $[S_{AV(2)}-S_{AV(3)}]=0.113$ GB/min. In other words, the amount of the write data stored on the third day is higher than the amount of the write data stored on the second day. As mentioned above, the threshold write speed $S_{TH}$ is 0.1 GB/min. In other words, $[S_{AV(2)}-S_{AV(3)}]<S_{TH}$ (0.1 GB/min). Therefore, on the fourth day, the TACW operation is disabled.

Figure 3D:
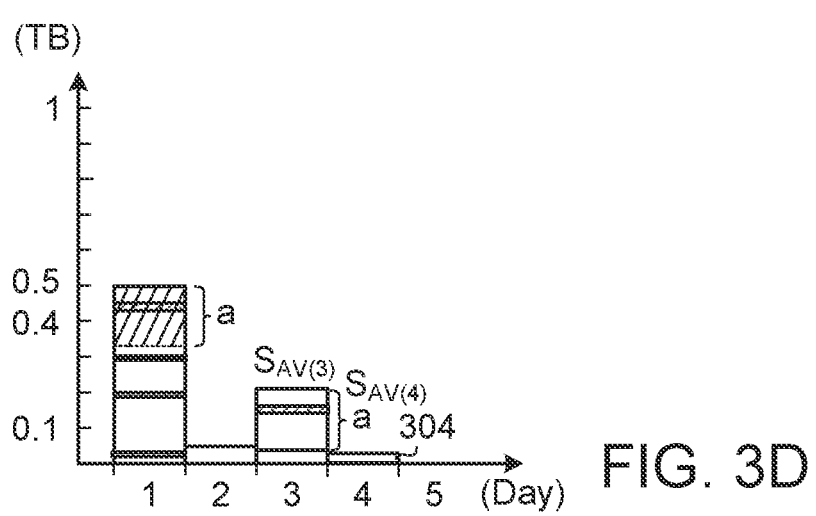

Please refer to FIG. 3D. On the fourth day, the write data 304 from the host 120 (e.g., approximately 0.03T) are stored into the non-volatile memory 140. Consequently, on the fourth day, the average write speed $S_{AV(4)}$ is approximately 0.021 GB/min. Moreover, the average write speed difference between the two consecutive time intervals is 0.128 GB/min, i.e., $[S_{AV(3)}-S_{AV(4)}]=0.128$ GB/min. In other words, the amount of the write data stored on the fourth day is lower than the amount of the write data stored on the third day. As mentioned above, the threshold write speed $S_{TH}$ is 0.1 GB/min. In other words, $[S_{AV(3)}-S_{AV(4)}]>S_{TH}$. Therefore, on the fifth day, the controlling circuit 210 will monitor the instant write speed $S_{IST(5)}$ to determine whether the TACW operation is enabled or not.

Figure 3E:
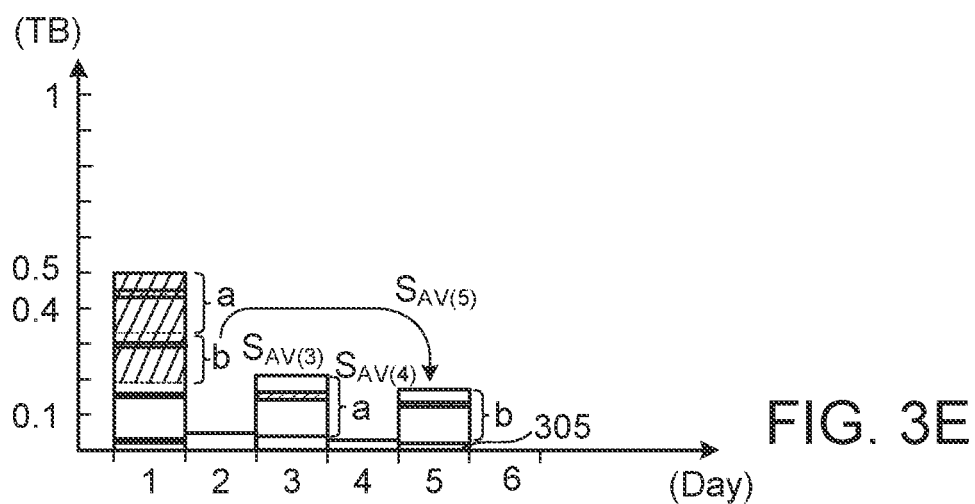

For example, on the fifth day, the controlling circuit 210 monitors that the instant write speed $S_{IST(5)}$ is higher than the average write speed difference between the two consecutive time intervals (0.128 GB/min). In other words, the amount of the write data from the host 120 is large. Meanwhile, the TACW operation is disabled by the controlling circuit 210. Whereas, as shown in FIG. 3E, the controlling circuit 210 monitors that the instant write speed $S_{IST(5)}$ is lower than the average write speed difference between the two consecutive time intervals (0.128 GB/min) on the fifth day. In other words, few amount of the write data from the host 120 is stored on the fifth day. Consequently, the TACW operation is enabled by the controlling circuit 210.

As shown in FIG. 3E, the amount of the write data on the first day is the largest. Consequently, when the TACW operation is performed on the fifth day, a portion of the write data stored on the first day (e.g., the portion "b") is moved to another location of the non-volatile memory 140 by the controlling circuit 210. After the write data is moved, the portion of the write data stored on the first day (e.g., the portion "b") will be changed as the invalid data (i.e., the region marked with oblique lines).

Please refer to FIG. 3E. On the fifth day, the write data contain the write data 305 from the host (e.g., approximately 0.02 TB) and the write data generated in the TACW operation (e.g., the portion "b" of approximately 0.15 TB). Moreover, the 0.15 TB of the write data generated in the TACW operation (e.g., the portion "b") contain valid data (i.e., the region marked with white color) and invalid data (i.e., the region marked with oblique lines).

On the fifth day, the write data stored into the non-volatile memory 140 is approximately 0.17 TB. Consequently, on the fifth day, the average write speed $S_{AV(5)}$ is approximately 0.121 GB/min. The average write speed difference between the two consecutive time intervals is -0.1 GB/min, i.e., $[S_{AV(4)}-S_{AV(5)}]=-0.1$ GB/min. In other words, the amount of the write data stored on the fifth day is higher than the amount of the write data stored on the fourth day. As mentioned above, the threshold write speed $S_{TH}$ is 0.1 GB/min. In other words, $[S_{AV(4)}-S_{AV(5)}]<S_{TH}$. Therefore, on the sixth day, the TACW operation is disabled.

Figure 3F:
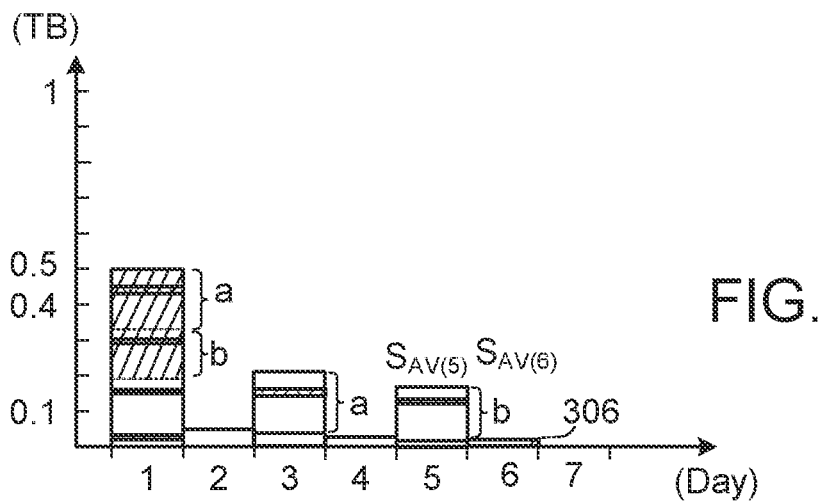

Please refer to FIG. 3F. On the sixth day, the write data 306 from the host 120 (e.g., approximately 0.02T) are stored into the non-volatile memory 140. Consequently, on the sixth day, the average write speed $S_{AV(6)}$. Moreover, the average write speed is approximately 0.014 GB/min. difference between the two consecutive time intervals is 0.107 GB/min, i.e., $[S_{AV(5)}-S_{AV(6)}]=0.107$ GB/min. In other words, the amount of the write data stored on the sixth day is lower than the amount of the write data stored on the fifth day. As mentioned above, the threshold write speed $S_{TH}$ is 0.1 GB/min. In other words, $[S_{AV(5)}-S_{AV(6)}]>S_{TH}$. Therefore, on the seventh day, the controlling circuit 210 will monitor the instant write speed $S_{IST(7)}$ to determine whether the TACW operation is enabled or not.

Figure 3G:
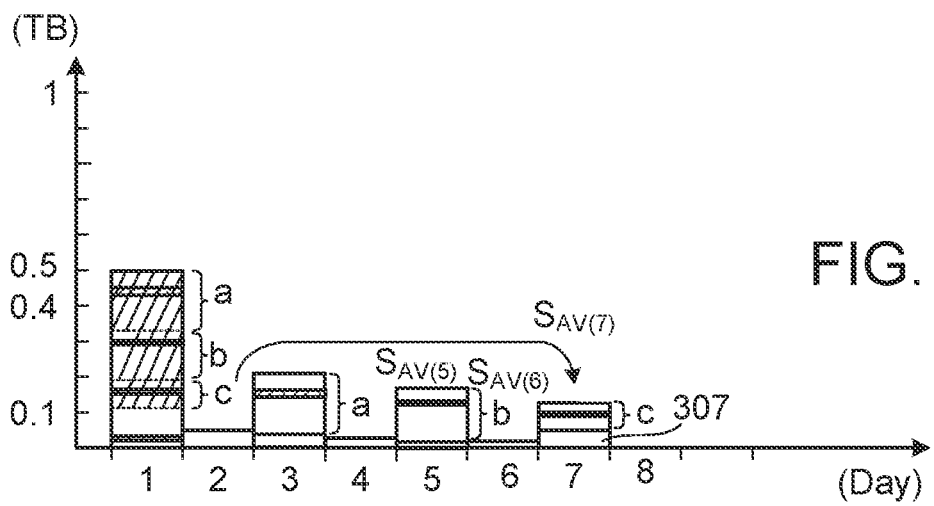
Figure 3H:
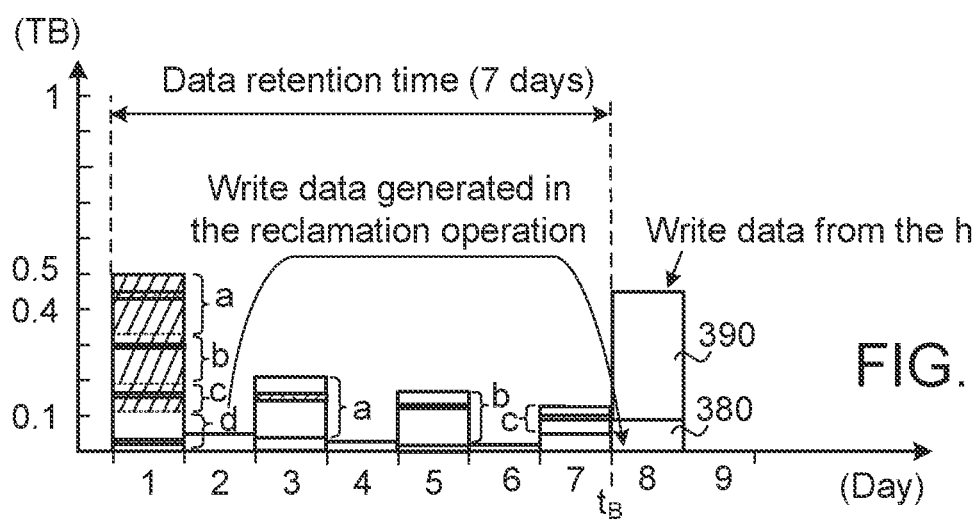

For example, on the seventh day, the controlling circuit 210 monitors that the instant write speed $S_{IST(7)}$ is higher than the average write speed difference between the two consecutive time intervals (0.107 GB/min). In other words, the amount of the write data from the host 120 is large. Meanwhile, the TACW operation is disabled by the controlling circuit 210. Whereas, as shown in FIG. 3G, the controlling circuit 210 monitors that the instant write speed $S_{IST(7)}$ is lower than the average write speed difference between the two consecutive time intervals (0.107 GB/min) on the seventh day. In other words, few amount of the write data from the host 120 is stored on the seventh day. Consequently, the TACW operation is enabled by the controlling circuit 210.

As shown in FIG. 3G, the amount of the write data on the first day is the largest. Consequently, when the TACW operation is performed on the seventh day, a portion of the write data stored on the first day (e.g., the portion "c") is moved to another location of the non-volatile memory 140 by the controlling circuit 210. After the write data is moved, the portion of the write data stored on the first day (e.g., the portion "c") will be changed as the invalid data (i.e., the region marked with oblique lines).

Please refer to FIG. 3G. On the seventh day, the write data contain the write data 307 from the host (e.g., approximately 0.05 TB) and the write data generated in the TACW operation (e.g., the portion "c" of approximately 0.08 TB). Moreover, the 0.08 TB of the write data generated in the TACW operation (e.g., the portion "c") contain valid data (i.e., the region marked with white color) and invalid data (i.e., the region marked with oblique lines).

On the seventh day, the write data stored into the non-volatile memory 140 is approximately 0.13 TB. Consequently, on the seventh day, the average write speed $S_{AV(7)}$ is approximately 0.092 GB/min. The average write speed difference between the two consecutive time intervals is 0.078 GB/min, i.e., $[S_{AV(6)}-S_{AV(7)}]=0.078$ GB/min. In other words, the amount of the write data stored on the seventh day is higher than the amount of the write data stored on the sixth day. As mentioned above, the threshold write speed $S_{TH}$ is 0.1 GB/min. In other words, $[S_{AV(6)}-S_{AV(7)}]<S_{TH}$. Therefore, on the seventh day, the TACW operation is disabled.

In the above embodiment, the solid state storage device 200 can selectively perform the TACW operation. Consequently, when the TACW operation is performed on the third day, a first portion of the write data (e.g., the portion "a") stored on the first day is moved by the controlling circuit 210. Similarly, when the TACW operation is performed on the fifth day, a second portion of the write data (e.g., the portion "b") stored on the first day is moved by the controlling circuit 210. Similarly, when the TACW operation is performed on the seventh day, a third portion of the write data (e.g., the portion "c") stored on the first day is moved by the controlling circuit 210. Obviously, only a fourth portion of the write data (e.g., the portion "d") stored on the first day is left, and the portion "d" contains approximately 0.1 TB of valid data.

For example, the data retention time is one week. Please refer to FIG. 3H again. For preventing from data loss or occurrence of erroneous data, the controlling circuit 210 has to immediately perform a data remediation process on the write data of the first day with a higher priority in the beginning of the eighth day (e.g., at the time point $t_B$). As mentioned above, only a fourth portion of the write data (e.g., the portion "d") stored on the first day is left, and the portion "d" contains approximately 0.1 TB of valid data. The other portions (e.g., the portion "a", the portion "b" and the portion "c") are moved to the other locations of the non-volatile memory 140 and changed as the invalid data. In other words, only the left and unmoved portion (e.g., the portion "d") of the write data stored on the first day (e.g., approximately 0.1 TB) needs to undergo the data remediation process. For example, the data remediation process is a reclamation operation or a touch read operation.

For example, the data remediation process is a reclamation operation. Firstly, the controlling circuit 210 performs the GC process to collect the valid data (i.e., the region marked with white color) in the fourth portion (i.e., the portion "d") of the write data of the first day, wherein the invalid data (i.e., the oblique region) are not collected. Then, the valid data (i.e., the region marked with white color) are moved to the other locations of the non-volatile memory 140. In other words, during the reclamation operation of the eighth day, the write data 380 generated in the reclamation operation are stored into other locations of the non-volatile memory 140 by the controlling circuit 210 again.

Obviously, the data amount of the fourth portion (i.e., the portion "d") is few, and the time period of performing the reclamation operation by the controlling circuit 210 is largely shortened. If the host 120 issues the write command to store the write data 390 (e.g., 0.35 TB) into the non-volatile memory 140 during the data remediation process, the writing latency of the solid state storage device 200 is largely shortened. Consequently, the performance of the solid state storage device 200 can be enhanced.

From above descriptions, the present invention provides a data management method for a solid state storage device. The solid state storage device 200 can selectively perform the TACW operation. When the write data 150 from the host is subjected to the write action by the controlling circuit 210, the controlling circuit 210 further monitors the instant write speed of the write action. According to the instant write speed, the controlling circuit 210 will monitor the instant write speed to determine whether the TACW operation is enabled or not. While the TACW operation is performed, the controlling circuit 210 determines a specified time interval corresponding to the largest amount of write data. Moreover, a portion of the write data stored in the specific time interval will be moved to another location of the non-volatile memory 140. When the solid state storage device 200 performs the data remediation process according to the data retention time, the time period of performing the data remediation process is largely shortened. Consequently, the performance of the solid state storage device 200 can be enhanced.

In the above embodiments, the time axis is divided into plural time intervals in units of 1 day. It is noted that the unit of the time interval is not restricted to 1 day. For example, in some other embodiments, the time axis is divided into plural time intervals in units of 6 hours or 12 hours. Similarly, the average write speed and the instant write speed are not restricted to be expressed in units of GB/min. For example, in some other embodiments, the average write speed and the instant write speed are expressed in units of GB/15 min, GB/0.5 hr, GB/1 hr or GB/0.5 day.

In the above embodiment, the write data 220 generated in the TACW operation contain valid data and invalid data (e.g., the portion "a", the portion "b" and the portion "c" of the write data). It is noted that numerous modifications and alterations may be made while retaining the teachings of the invention. For example, in another embodiment, the write data contain valid data only. Moreover, the data amount of the portion "a", the portion "b" or the portion "c" may be determined according to the instant write speed, the average write speed difference between the two consecutive time intervals, and the unmoved data amount of the largest amount of write data.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data management method for a solid state storage device, the solid state storage device comprising a non-volatile memory, the data management method comprising steps of:
    calculating a first average write speed in an (N−2)-th time interval, wherein N is a positive integer;
    calculating a second average write speed in an (N−1)-th time interval, wherein after the second average write speed is subtracted from the first average write speed, an average write speed difference is obtained;
    if the average write speed difference is lower than a threshold write speed, disabling a time axis compensator write operation in an N-th time interval;
    monitoring an instant write speed;
    if the average write speed difference is higher than the threshold write speed and the instant write speed is higher than the average write speed difference, disabling the time axis compensator write operation in the N-th time interval; and
    if the average write speed difference is higher than the threshold write speed and the instant write speed is lower than the average write speed difference, enabling the time axis compensator write operation in the N-th time interval.

2. The data management method as claimed in claim 1, wherein the (N−2)-th time interval and the (N−1)-th time interval indicate two consecutive time intervals prior to the N-th time interval.

3. The data management method as claimed in claim 1, wherein while a write data from a host undergoes a write action by a controlling circuit of the solid state storage device in the N-th time interval and the write data from the host is stored into the non-volatile memory, the controlling circuit monitors the instant write speed during the write action.

4. The data management method as claimed in claim 3, wherein while the time axis compensator write operation is performed, the controlling circuit determines a specified time interval prior to the N-th time interval, and a first portion of a write data stored in the specified time interval is moved to another location of the non-volatile memory.

5. The data management method as claimed in claim 4, wherein while the time axis compensator write operation is performed, the first portion of the write data contains valid data and invalid data.

6. The data management method as claimed in claim 4, wherein among N time intervals between a first time interval and the N-th time interval, the write data in the specified time interval has the largest data amount, wherein a time length between the specified time interval and the N-th time interval is shorter than a data retention time.

7. The data management method as claimed in claim 6, wherein before a storage time of the write data stored in the non-volatile memory in the specified time interval reaches the data retention time, the controlling circuit performs a data remediation process.

8. The data management method as claimed in claim 7, wherein the controlling circuit performs the data remediation process on a second portion of the write data that is stored in the specified time interval, wherein the second portion of the write data is left and unmoved.

9. The data management method as claimed in claim 7, wherein the data remediation process is a reclamation operation or a touch read operation.

* * * * *